United States Patent [19]

Tambor

[11] 4,123,164
[45] Oct. 31, 1978

[54] AUTOCOLLIMATING ASSEMBLY FOR THE SELF-CALIBRATION OF A STELLAR NAVIGATIONAL SYSTEM

[75] Inventor: Ronald Tambor, Maplewood, N.J.

[73] Assignee: The Singer Company, Little Falls, N.J.

[21] Appl. No.: 756,517

[22] Filed: Jan. 3, 1977

[51] Int. Cl.$^2$ .................. G01B 11/26; G01C 1/10
[52] U.S. Cl. .................. 356/152; 33/268; 250/203 R; 356/149
[58] Field of Search .......... 73/505; 33/268, 320; 356/147, 149, 152, 250; 244/3.18; 250/203 R; 235/150.25

[56] References Cited

U.S. PATENT DOCUMENTS

| 3,239,673 | 3/1966 | Unruh | 250/203 R |
| 3,310,876 | 3/1967 | Yamron | 33/268 |
| 3,448,272 | 6/1969 | Slater | 356/152 |

OTHER PUBLICATIONS

Wong; J. Physics E (GB), vol. 4, No. 3, Mar. 1971.

Primary Examiner—S. C. Buczinski

Attorney, Agent, or Firm—Thomas W. Kennedy

[57] ABSTRACT

An autocollimating assembly is provided for the tracking or position-sensing sub-system of a stellar navigational system, the sub-system being mounted on the stable platform of an inertial measuring unit. The autocollimating assembly, in conjunction with mirrors mounted on the internal surface of the spherical case of the inertial measuring unit permits accelerometer bias, scale factor and alignment measurements to be made, as well as gyro drift and alignment measurements, and sensor alignment for scale factor measurements, with the sub-system installed in the space vehicle. The autocollimating assembly of the invention includes a pattern of point light sources which generate a plurality of light beams which are collimated by the lens system of the sub-system, the beams being reflected back from one of the mirrors on the internal surface of the case of the inertial measuring unit. The reflected light is focused onto the surface of the vidicon or solid state stellar sensor in the sub-system. The angle $\theta$ of the mirror can be measured by the linear displacement of the light image on the sensor surface from its nominal position.

7 Claims, 6 Drawing Figures

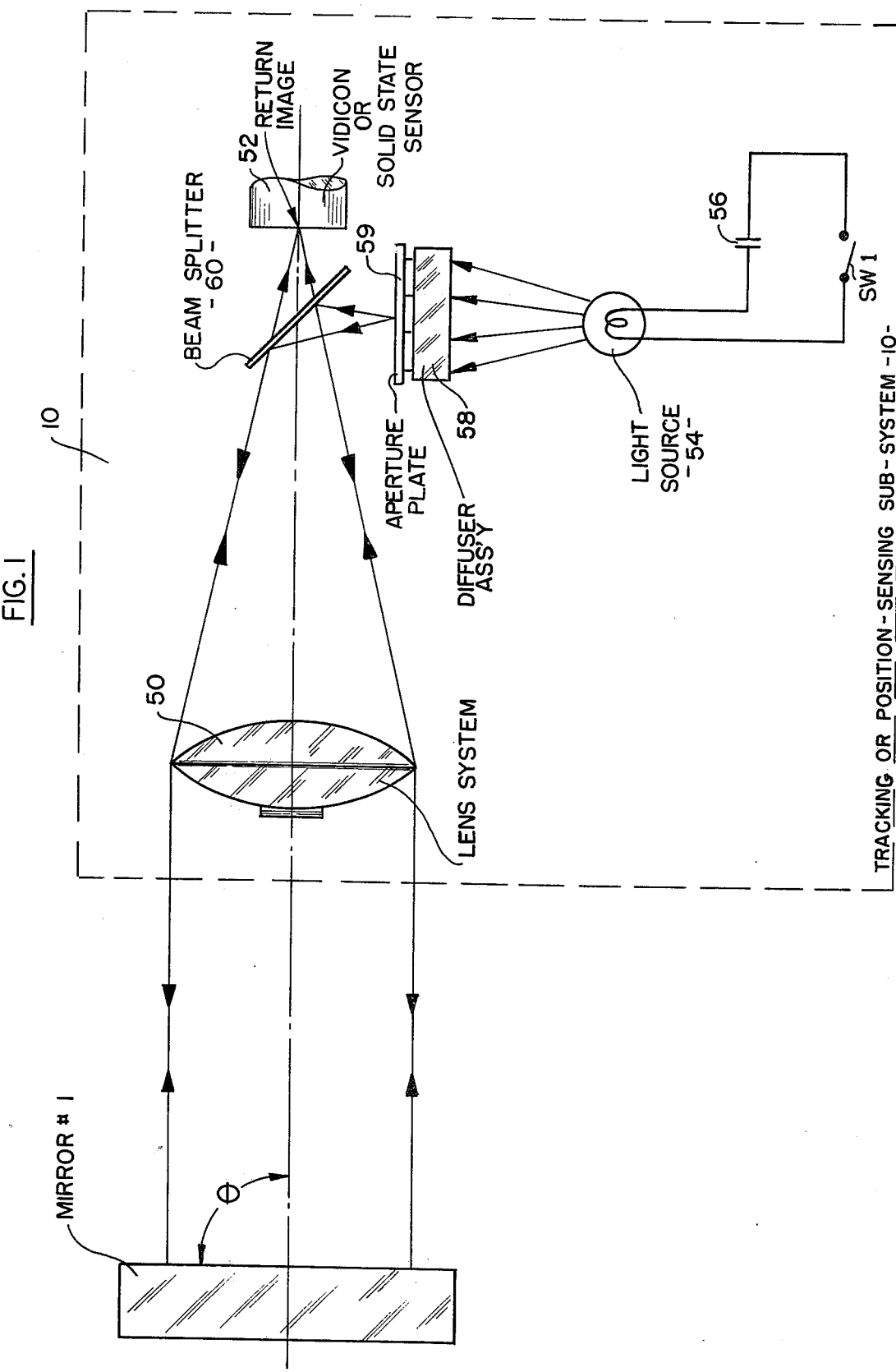

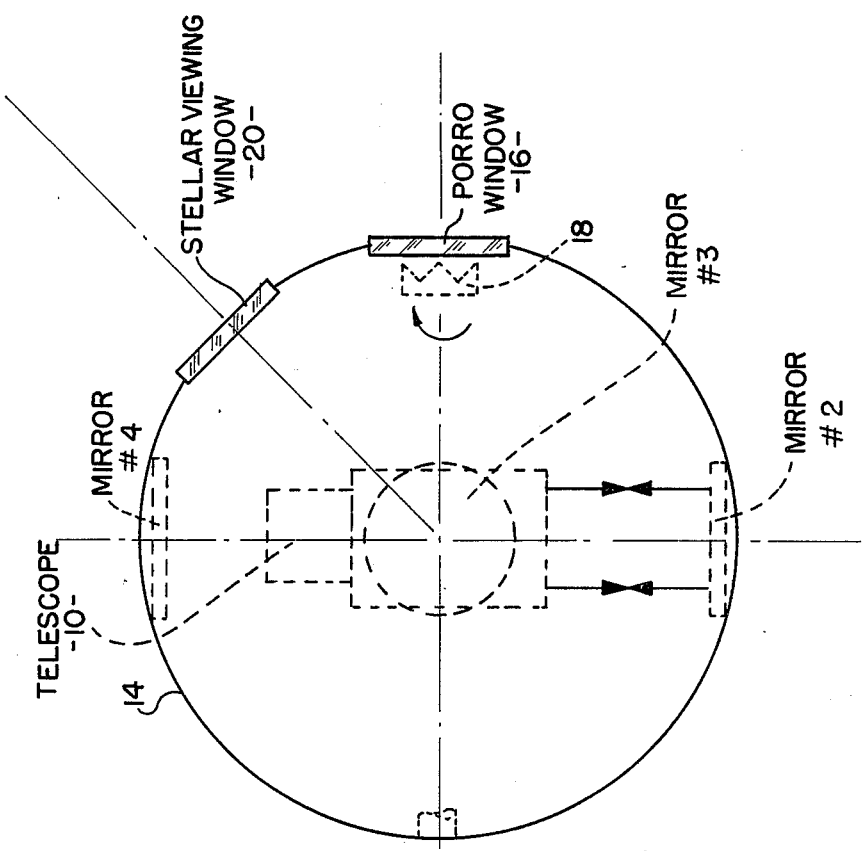
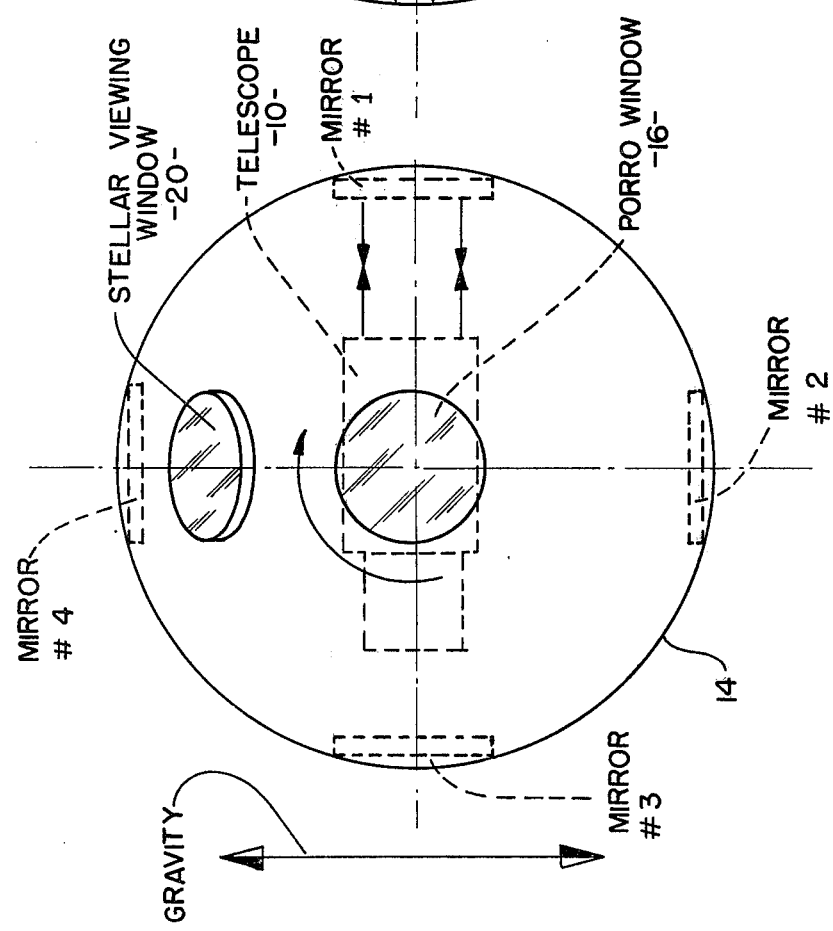

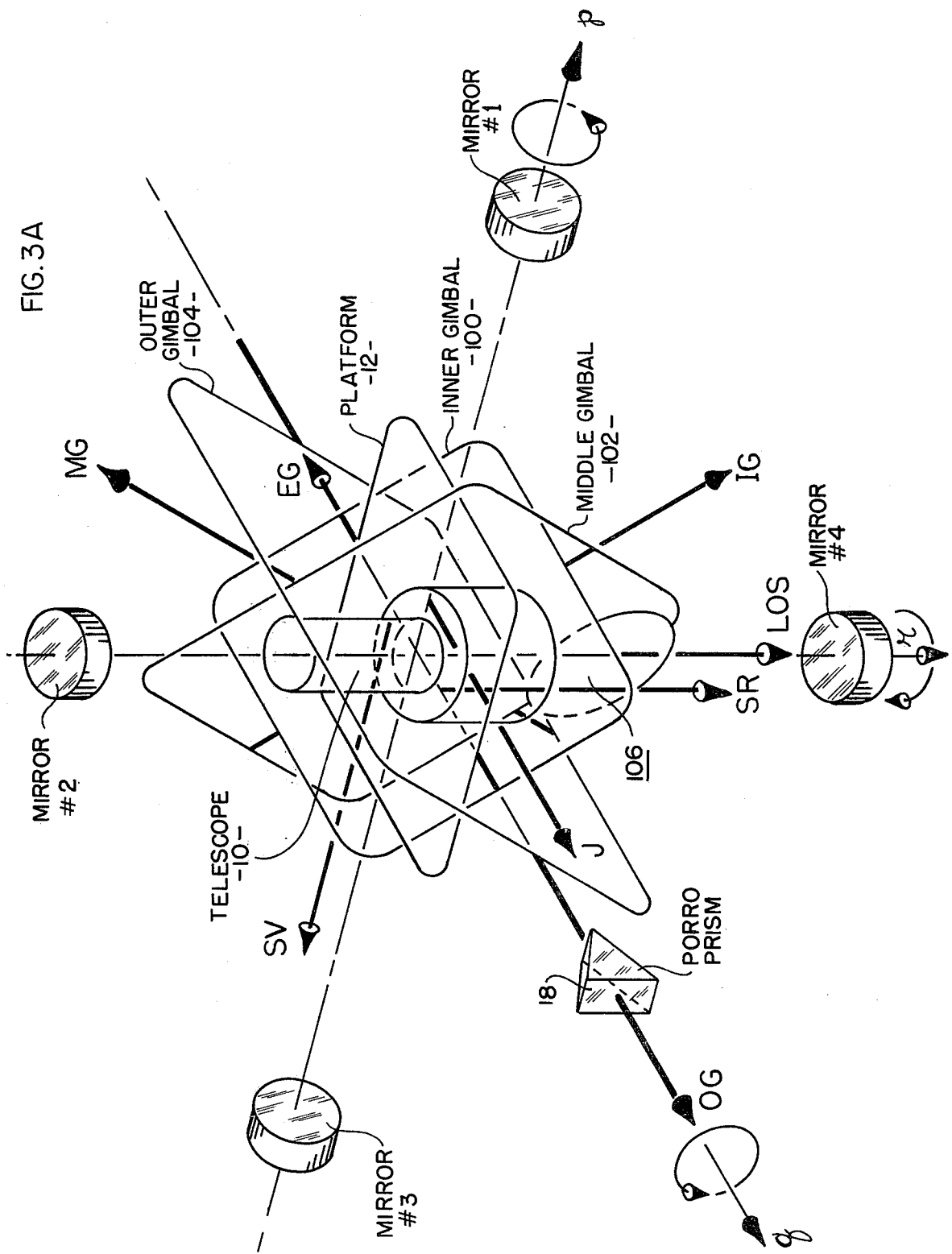

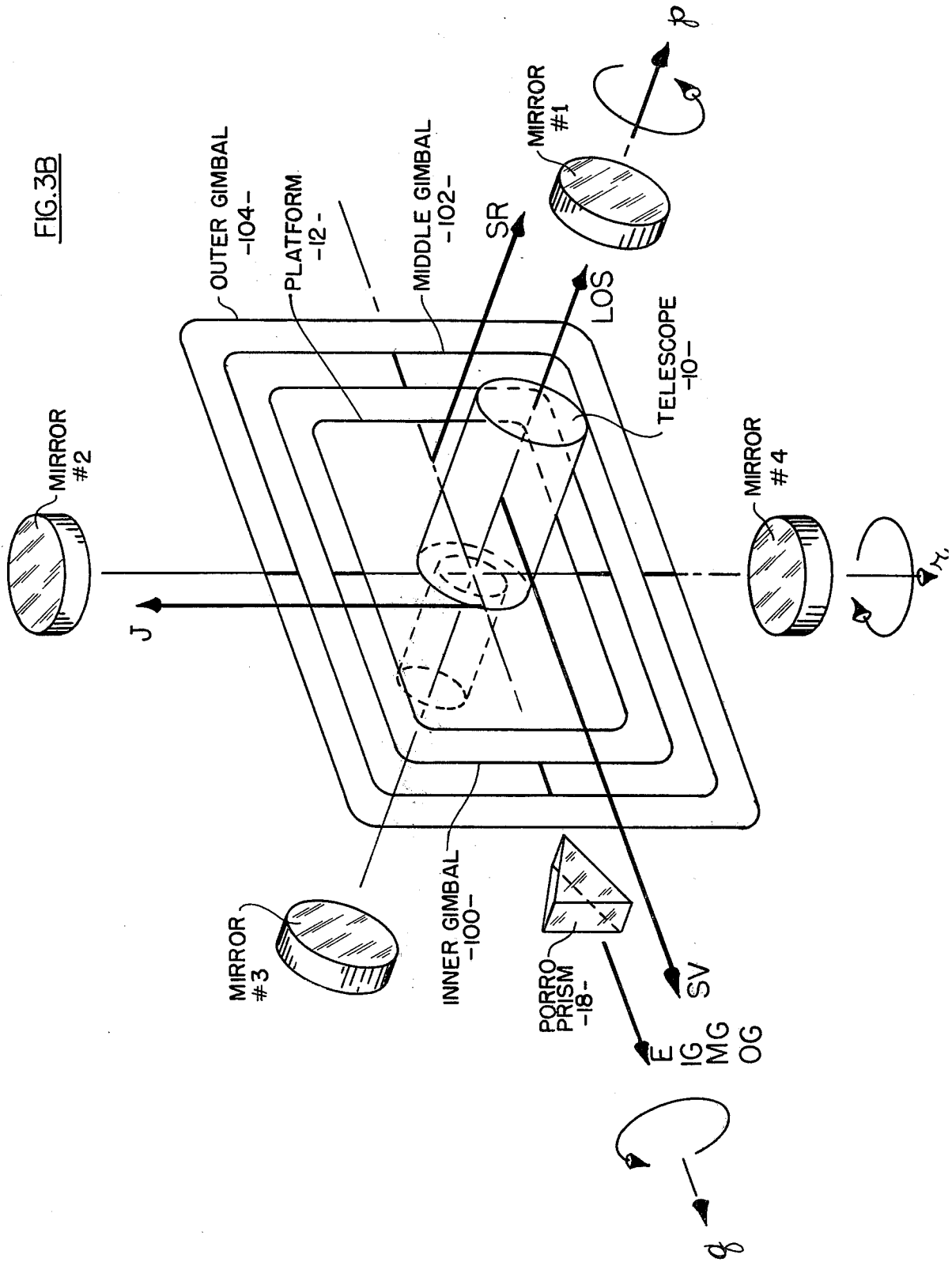

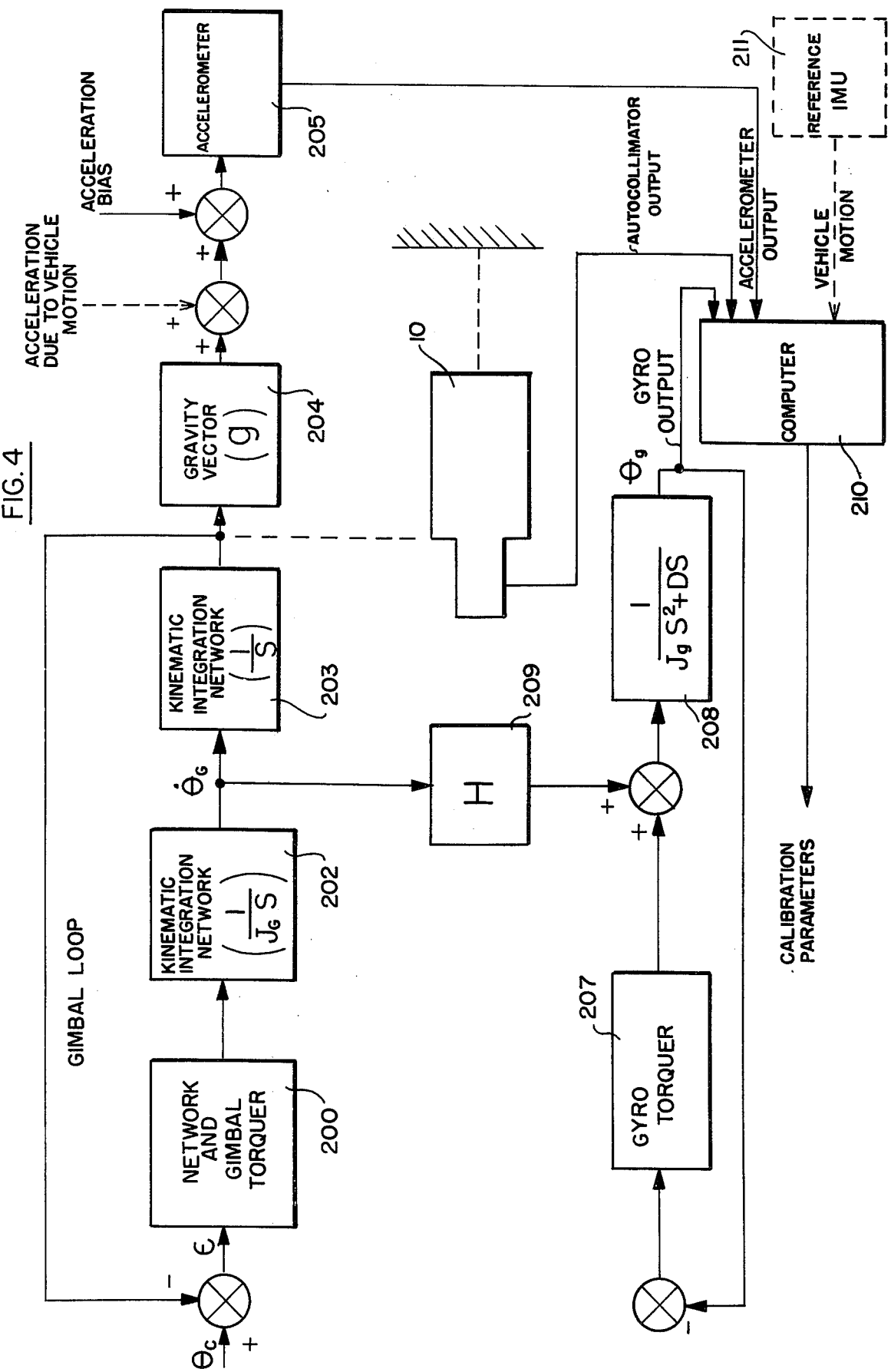

AUTOCOLLIMATING ASSEMBLY FOR THE SELF-CALIBRATION OF A STELLAR NAVIGATIONAL SYSTEM

The invention herein described was made in the course of or under a contract, or sub-contract thereunder, with the United States Government.

BACKGROUND OF THE INVENTION

One type of prior art stellar navigational system incorporates a tracking sub-system which, together with a flight computer, computes the position of a selected star relative to the vehicle in which the sub-system is mounted, searches out the star, tracks the star accurately, and determines the terrestial position of the vehicle. The sub-system includes a telescope which during operation of the sub-system is locked onto the star; and the sub-system also includes a vidicon or solid state stellar sensor. An image of the star is focused onto the surface of the stellar sensor by the optical system of the telescope. By using a closed servo loop, the corrections from the tracking sub-system can be used to correct the values of input latitude and longitude, so that latitude and longitude counters can be up-dated as long as the tracking sub-system is locked onto the selected star.

The tracking sub-system is gyro stabilized, such stabilization being achieved by mounting the sub-system on a stable platform in an inertial measuring unit. The inertial measuring unit is a self-contained system which can automatically maintain angular reference directions in inertial space. The inertial measuring unit includes a platform supported, for example, on three gimbals. The tracking sub-system is mounted on the platform, as are, for example, three single-axis gyros designated the X-gyro, the Y-gyro and the Z-gyro. Any drift of the platform from the attitude prescribed by the gyros causes one or more of the gyros to generate signals, each of which is applied in a corresponding servo loop to a corresponding torquer motor which, in turn, applies a correction torque to the corresponding gimbal to return the platform to its stabilized position. Accelerometers are also mounted on the platform to measure the acceleration of the vehicle along each of the three coordinate axes.

Another type of stellar navigational system includes a position-sensing sub-system which is sighted on a selected star, and which causes an error signal to be generated if the actual relative position of the star differs from the position it would have if the vehicle were on course. The error signal is used to make the necessary corrections on the navigation system.

The autocollimator assembly of the present invention may be used in either the tracking or position-sensing sub-systems described above. The assembly of the invention, in conjunction with a number of position-indexing mirrors mounted at selected angular positions on the internal surface of the spherical case of the inertial measuring unit of the stellar navigation system in which the autocollimator assembly is installed, measures sensor misalignments and scale factor; accelerometer input axes bias, scale factor and misalignments; gyro drift; and the like, with the accelerometers, gyros and sensor actually installed in the space vehicle. The autocollimating assembly of the present invention is advantageous in that it permits greater accuracy than can be achieved with the prior art systems which use external equipment and electro-mechanical transfer devices, such as gimbal angle synchros, since the assembly of the invention makes direct measurements on the components and elements of the navigational system. The autocollimating assembly of the invention is also advantageous in that it is capable of making its measurements while the elements and components of the tracking or position-sensing sub-system are actually installed in the vehicle, which allows shorter periodic up-dating of instrument parameters to minimize errors caused by long term shifts and uncertainties between factory calibrations and installation.

Briefly stated, the invention provides an electro-optical system for accurately indexing the sensor of the tracking or position-sensing sub-system of a stellar navigational system relative to the gravity and earth rate vectors. This is accomplished, as will be described, by using different gimbal orientations, in which the tracking telescope is directed at different ones of the position-indexing mirrors on the internal surface of the case of the inertial measuring unit, and making measurements for each orientation. The different positions are selected so that each accelerometer and each gyro experiences +1G, 0G, −1G; and either along or perpendicular to the earth rate vector, this being important for gyro calibration.

BRIEF DESCRIPTION OF THE DRAWINGS

FIG. 1 is a schematic representation of the tracking or position-sensing sub-system of a stellar navigational system, and which includes the autocollimating assembly of the invention;

FIG. 2A is a view of the inertial measuring unit in which the sub-system of FIG. 1 is mounted;

FIG. 2B is a further view of the inertial measuring unit turned 90° with respect to the view of FIG. 2A;

FIG. 3A is a schematic representation of the internal components of the inertial measuring unit of FIGS. 2A and 2B, with the stable platform and gimbals within the unit being positioned for one particular measurement by the autocollimating assembly of the invention;

FIG. 3B is a schematic representation of the internal components of the inertial measuring unit, with the tracker telescope being directed at a second mirror within the unit for a second set of calibration measurements; and FIG. 4 is a system block diagram useful in explaining the operation of the invention in one of its calibration modes, such as shown in FIGS. 3A and 3B.

DETAILED DESCRIPTION OF THE ILLUSTRATED EMBODIMENT

Referring first to FIGS. 2A and 2B, it will be noted that the tracking or position-sensing sub-system 10 is mounted on a stable platform 12 (FIGS. 3A and 3B) within the spherical case 14 of an inertial measuring unit. Communication between the unit and the outside world is achieved through a porro window 16 and associated lens 18. During normal operation, the telescope included in sub-system 10 is pointed through a stellar viewing window 20 in the case 14.

In accordance with the invention, position-indexing mirrors, such as the four mirrors designated 1-4 are mounted on the internal surface of the spherical case 14 of the inertial measuring unit at precisely fixed predetermined angular positions thereon.

The tracking telescope of sub-system 10, as shown in FIG. 1, includes a usual lens system 50 which, during normal operation of the sub-system, responds to the collimated rays from the distant selected star to focus an image of the star on the surface of a vidicon or solid state sensor 52. As is well known to the art, the sensor 52 measures any linear displacement of the image from a nominal position on its surface which, in turn, represents an angular displacement of the line-of-sight of the telescope from the star at which it is directed, and the sensor sets up corresponding error signals. In the tracking sub-system, these error signals are used in an associated servo system to maintain the sub-system locked on the star.

During a calibration mode, the telescope of sub-system 10 is directed at one of the four position-indexing mirrors 1, 2, 3 or 4 in FIGS. 2A and 2B, such as, for example, mirror #1. The autocollimating assembly of the invention includes a light source 54 located within the telescope, and which is energized by an appropriate battery 56 upon the closing of a switch SW1. Light from the light source is directed through an appropriate diffuser assembly 58, and through an aperture plate 59 which forms a pattern of point light sources for the assembly. The pattern of point light sources formed by aperture plate 59 allow for better resolution and greater sensor bias and scale factor determination when the sub-system is in the self-calibrating mode, as would be the case with a single point light source. Light beams from the point light sources are directed to a beam splitter mirror 60, from which they are reflected through the lens system 50 of the telescope to the mirror #1. The light beams from the light sources are collimated by the lens system, and the collimated light beams are reflected back from the mirror #1, and a portion of the reflected light passes through beam splitter 60 to the surface of the sensor 52, while another portion is reflected by the beam splitter back to the aperture plate 59.

The autocollimating assembly of the invention, therefore, generates a point light source pattern which is situated at a focal length equal to the focal length of sensor 52, with respect to the lens system 50. As described, the resulting light beams are reflected by the beam splitter 60 and are collimated by the lens system 50. Position-indexing mirror 1 reflects the light beams back into the lens system 50 which focuses the light in the plane of sensor 52 and in the plane of aperture plate 59. It should be noted that the beam splitter ratio of the beam splitter 60, that is, the transmittance divided by the reflectance, can be set by design depending on the strength of light source 54, the losses of lens system 50 and the sensitivity of sensor 52. The angle $\theta$ of the mirror 1 can be measured by the linear displacement of the return images on the surface sensor 52 from their nominal position. The images assume their nominal position when mirror 1 is perpendicular to the optical axis. The bias and scale factor of the sensor must be taken into consideration during such measurement.

As described above, FIGS. 2A and 2B show two views of the combination of the position-indexing mirrors #1-#4, and the autocollimating assembly of a self-calibrating inertial measurement unit. The four position-indexing mirrors #1-#4 are shown in a plane perpendicular to the porro axis. The mirror surface orientation relative to the porro prism 18 and outer gimbal axis is determined in the factory. Various gimbal orientations are used in conjunction with the autocollimating assembly of the invention to determine inertial components bias, scale factor and misalignment, periodically so as to minimize long term stability error effects. Two such orientations are shown, for example, in FIGS. 3A and 3B.

As shown in the schematic representations of FIGS. 3A and 3B, the platform 12 of the inertial measuring unit is mounted on three gimbals, designated inner gimbal 100, middle gimbal 102 and outer gimbal 104. The inner gimbal is pivoted about an inner gimbal axis designated IG; the middle gimbal is pivoted about a middle gimbal axis designated MG; whereas, the outer gimbal is pivoted about an outer gimbal axis OG, which corresponds with the elevational axis EG of the vehicle.

The inertial measuring unit also includes three accelerometers (not shown) which sense accelerations along respective axes designaved SV, J and SR. Viewing ports, such as port 106 are provided in the gimbals to provide a line-of-sight for the telescope to the position-indexing mirrors #1-#4 for various positions of the gimbals, in which the line-of-sight would otherwise be obstructed. The tracking telescope 10 is also mounted on the stable platform and is directed along an optical axis designated LOS.

In carrying out the measurements by the autocollimating assembly of the invention, the gimbals are caged to each of the four separate measurement positions, two of which are shown, for example, in FIGS. 3A and 3B. The gyros are torqued to zero and their outputs are measured. The outputs of the accelerometers are also measured.

A block diagram of a typical calibration system is shown, for example, in FIG. 4, which is a representation showing the manner the various loops and functions are connected and cooperate to cause the autocollimating stellar sensor, which is mounted on platform 12 (FIG. 3A) to remain approximately stationary with respect to the selected one of mirrors #1-#4 during a reading.

In the system of FIG. 4, block 200 represents an electro-mechanical sub-system which includes appropriate servo electronics and servo motors to rotate one gimbal with respect to the others. Block 202 representa kinematic integration network which performs a kinematic integration ($1/J_G S$), where:

$J_G$ is the gimbal ssembly moment of inertia, and
S is a LaPlace variable.

Block 203 is a kinematic integration network which perform a kinematic integration (1/S). Block 204 represents the gravity vector:

$g$ = acceleration due to gravity
$g(\theta_G)$ = small angle approximation of
$g \sin\theta_G$ = vertical component of gravity sensed by an accelerometer when the gimbal is off level, i.e., $\theta_G \neq 0$.

Block 205 represents the accelerometer scale factor. The accelerometer output = bias + scale factor X sensed acceleration. Block 207 is an electro-mechanical torque generator which serves to move the wheel of the corresponding gyro to null the gyro output angle ($\theta_G$). Block 210 is the flight computer. Block 211 is a reference inertial measuring unit. Block 208 represents the angular rate transfer function of the gyro ($1/J_g S^2 + DS$), where:

$J_g$ = gyro moment of inertia,
$S$ = La Place variable,
$D$ = coefficient of viscous friction.

Block 209 represents the gyro angular momentum (H).

In the system of FIG. 4:

$\theta_c$ = case angular position at a certain time
$\theta_G$ = gimbal angular position at the certain time
$\epsilon = \theta_c - \theta_G$ = case/gimbal angle.

In the system of FIG. 4, the gimbal loop, represented by blocks 200, 202 and 203, is closed on itself to torque the gyro wheel to null, and thereby to reduce the gyro pick-off error signal $\epsilon$ to zero. While this is occurring, the accelerometer output from block 205 is being processed by computer 210, together with the gyro torquer output from block 208, the autocollimeter output from sub-system 10, and the vehicle motion signal from reference inertial measuring unit 211. The computer processes the aforesaid inputs to derive the various instrument calibration parameters.

The calibration parameters derived from the computer in the system of FIG. 4 include the following:

1. Accelerometers (a) bias
(b) scale factor
(c) scale factor difference for up and down conditions
(d) alignment.

2. Gyros (a) bias drift
(b) acceleration drift
(c) alignment.

3. Telescope (a) alignment to acceleration frame of reference
(b) self-calibration of bias and scale factor of sensor.

The invention provides, therefore, an autocollimator assembly mounted within the tracking or position-sensing sub-system of a stellar navigational system which, in conjunction with a mirror system on the inner surface of an inertial measuring unit forms an electro-optical system for accurately indexing the sub-system relative to the gravity and earth rate vectors. This indexing is accomplished by using different gimbal orientations, such as described. The autocollimating assembly of the invention can be used while the vehicle is actually in motion, or for usual laboratory tests.

It will be appreciated that while a particular embodiment of the invention has been shown and described, modifications may be made. It is intended in the following claims to cover the modifications which come within the spirit and scope of the invention.

What is claimed is:

1. In a stellar navigation system having an inertial platform bearing a tracking or position-sensing sub-system including a sensor and a telescope with a lens system for focusing collimated light from a selected star into the plane of the sensor, the improvement comprising an assembly for accurately indexing the tracking or position-sensing sub-system which includes:
    a light source;
    means for directing light from said source through the lens system of the telescope to be collimated thereby;
    a position-indexing mirror placed outside the inertial platform so that when the telescope is in alignment with the mirror, the mirror will reflect the collimated light back through the lens system into the plane of the sensor, thereby causing the sensor to generate electrical signals representing the angular displacement of the reflected light from a nominal position on the sensor; and
    means for moving the telescope from a normal viewing position into alignment with the position-indexing mirror.

2. The assembly defined in claim 1, in which said light source comprises an electric lamp, a diffuser assembly, and an aperture plate.

3. The assembly defined in claim 1, in which said source comprises a plurality of point light sources.

4. A method for accurately indexing a sensor of a tracking or position-sensing sub-system of a stellar navigation system mounted on an inertial platform, said sub-system also including a telescope relative to gravity and earth rate vectors, which comprises:
    directing light from a light source into the lens system of the telescope with a lens system for focusing collimated light from a selected star into the plane of the sensor;
    collimating the light directed into said lens system;
    placing a position-indexing mirror outside the inertial platform so that when the telescope is in alignment with the mirror, the mirror will reflect the collimated light back through the lens system into the plane of the sensor;
    moving the telescope from a normal viewing position into alignment with the position-indexing mirror; and
    generating electrical signals representing the angular displacement of the reflected light from a nominal position on the sensor.

5. An autocollimating assembly for a sub-system of a stellar navigational system, said sub-system including a sensor and a lens system for focusing collimated light from a selected star into the plane of the sensor and said sub-system being mounted on the stable platform of an inertial measuring unit having a case of spherical configuration; said autocollimating assembly including:
    a light source;
    means located within the sub-system for directing light from said light source through the lens system to be collimated thereby; and
    a plurality of external position-indexing mirrors positioned at pre-selected positions on the inner face of said case in the optical path of the resulting collimated light rays to reflect the light back through the lens system to be focused thereby into the plane of the sensor, thereby to cause the sensor to generate electric signals representative of angular displacements of the focused image of the reflected light from a nominal position on said sensor.

6. The autocollimating assembly defined in claim 5, in which said light source comprises an electric lamp, a diffuser assembly, and an aperture plate.

7. The autocollimating assembly defined in claim 6, in which the aperture plate and said sensor are in the focal plane of said lens system.

* * * * *